Fig. 1.

INVENTOR.
RICHARD G. ANGELL, JR.

April 1, 1969 R. G. ANGELL, JR 3,436,446
MOLDING OF FOAMED THERMOPLASTIC ARTICLES
Filed June 8, 1966 Sheet 2 of 3

INVENTOR.
RICHARD G. ANGELL, JR.
BY 
ATTORNEY

INVENTOR.
RICHARD G. ANGELL, JR.
ATTORNEY

United States Patent Office 3,436,446
Patented Apr. 1, 1969

3,436,446
MOLDING OF FOAMED THERMOPLASTIC
ARTICLES
Richard G. Angell, Jr., Bridgewater Township, Somerville, N.J., assignor to Union Carbide Corporation, a corporation of New York
Continuation-in-part of applications Ser. No. 291,898, July 1, 1963, and Ser. No. 364,382, May 4, 1964, and Ser. No. 453,130, May 4, 1965. This application June 8, 1966, Ser. No. 556,103
The portion of the term of the patent subsequent to Aug. 23, 1983, has been disclaimed
Int. Cl. B29f 1/00; B29d 27/00
U.S. Cl. 264—51                                                    25 Claims

ABSTRACT OF THE DISCLOSURE

Method and apparatus for molding foamed plastic articles with a solid skin wherein a blowing agent and thermoplastic article are fluxed in an extruder and continuously fed to an accumulation zone all while being maintained at a temperature and pressure above the foaming temperature and pressure. The molten mixture is forced from the accumulation zone to a mold where it foams and communication between the mold and the accumulation zone is terminated at a point where the pressure is above the foaming pressure of the mixture thereby avoiding the formation of unfoamed or partly foamed material in the apparatus.

---

This application is a continuation-in-part of copending applications Ser. No. 291,898, filed July 1, 1963, now U.S. Patent 3,268,636 issued Aug. 23, 1966, Ser. No. 364,382, filed May 4, 1964, and Ser. No. 453,130, filed May 4, 1965, both now abandoned.

This invention relates to the molding of foamed thermoplastic articles characterized by a high degree of stiffness, a cellular core and a substantially non-cellular, integral peripheral shell having a unique mottled surface. More particularly, this invention relates to improved process for molding such foamed thermoplastic articles and an improved apparatus for carrying out the process.

It has been proposed to employ injection molding techniques to mold foamed thermoplastic articles. In using such techniques, particulate resin mixed with a blowing agent is pushed under pressure through a pre-injection zone where the resin is warmed but remains in the solid state. The pre-injection zone conventionally contains a solid spreader more commonly known as a torpedo. From the pre-injection zone, the warmed, solid resin is pushed under pressure to an injection zone which is isolated from the pre-injection zone when it is full of resin. In the injection zone the resin is warmed further, to a temperature to decompose the blowing agent but under sufficient pressure to prevent foaming, until it becomes a mobile gel. At this point, a valve is opened and the gel is injected into a mold under partial vacuum where the resin foams into a uniformly porous, multicellular structure of uniform density. When the mold is full, the valve is closed and communication between the pre-injection and injection zones is again established and the process repeated. The drawbacks to this process, however, are numerous. For instance, maintaining the mold under partial vacuum requires additional equipment and lengthens the molding cycle. More importantly, it is almost impossible to heat resin without a blowing agent uniformly in a cylinder without adequate mixing. Where the resin is mixed with a blowing agent, this problem of obtaining proper heat transfer is only compounded. Without mixing, the blowing agent near the surfaces of the cylinder will decompose but the blowing agent remote from the cylinder surfaces oftentimes never heats up and consequently never decomposes. Also inherent in the process is the inability to admix resin and blowing agent as an integral part of the molding process. Resin and solid, decomposable blowing agent must be premixed and the use of a gaseous blowing agent, for all practical purposes, is precluded because of this inability to admix. Also, because of the uniform nature of the foamed product, its strength characteristics are seriously limited. Foamed articles produced by the above described injection process have generally low strengths commensurate with their density and cannot be used in load-bearing applications.

Injection molding of solid or foamed articles normally produces an article having an unsightly sprue which is formed in the feed inlet to the mold. Such sprues are removed in a subsequent operation or the feed inlet is positioned so that the sprue will not show on the finished article. To injection mold sprue-free articles, it has been proposed to make the feed inlet to an injection mold a part of the cylinder in which the injection ram travels so that the bottom of the ram can come flush with the mold cavity thereby producing a sprue-free article. This arrangement, however, has not been entirely satisfactory because when the ram is cool enough to solidify the plastic, which is necessary for part removal, freezing or sticking of the plastic to the ram occurs and, in fact, an unsightly sprue is formed. This problem is not solved by keeping the ram warm because the plastic will not solidify and will distort when removed from the mold. Furthermore, with this arrangement it is extremely difficult to mold a small part or an open structured part because of the large surface area of the face of the injection ram.

Perhaps the most serious problems met with injection molding of foamed articles is the formation of a sprue on the uniformly porous structure and the formation in the equipment of an unfoamed slug which enters the mold on the next succeeding molding cycle creating an undesirable unfoamed, solid region in what should otherwise be a completely foamed article. This unfoamed slug is generally formed in the valve which connects the injection zone and the mold and/or in the conduits leading to and from the valve. When this valve is open, the drop in pressure allows the gas to escape from the resin but the resin does not foam because it is in a confined area, namely the flow passages in the valve and/or the conduits in communication therewith.

In an attempt to overcome the shortcomings met with the injection molding of foamed articles, it has been proposed to use a preform injection foam molder. Such a device, however, requires the use of a retractable mold, which seriously limits the size and shape of the foamed articles that can be produced. Generally, only very simple shapes such as cylinders and spheres can be molded. For example, this device cannot, for all practical purposes, mold a large, thin walled, open structure article such as a tote box or the like. Moreover this device, like the injection process, produces a foamed article of uniform density and cell distribution.

It has also been proposed to mold foamed articles by injecting a molten mixture of a thermoplastic resin and a blowing agent into a mold while maintaining the pressure above the foaming pressure of the mixture. While in the mold, the mixture is cooled to form a dense skin about the periphery of the mold. Before the center cools and solidifies, the pressure is released to produce a foam core and excess foamed material is forced out of the mold through the injection port. This method of molding foamed articles is inefficient in that two cooling periods are required for the skin and the foamed core. More importantly, excess foamed material is allowed to foam back into the apparatus or out of the mold. This excess material must be reconverted to the unfoamed, molten state before the next molding cycle can be carried out or must be reground and recycled.

It has now been discovered, in accordance with this invention, that sprue-free foamed articles having a cellular core and a dense shell can be molded from thermoplastics, even those with very high viscosities, with more complex configuration in molds having long flow paths and sharp corners than heretofore employed with solid injection molding. Moreover, problems heretofore met in the injection molding of foamed articles are overcome. Foamed thermoplastic articles can be molded rapidly and efficiently in accordance with this invention having thicker sections, a high quality finish, and strength and weight advantages as compared to injection molded solid articles.

The present invention is an improvement over the process and apparatus of said copending application Ser. No. 291,898 wherein foamed thermoplastic articles are molded by melting a mixture of a blowing agent and a foamable thermoplastic material in an extruder at a temperature above the foaming temperature of said blowing agent and at a pressure above the foaming pressure thereof, extruding the resulting molden mixture into an expanding accumulation zone while maintaining said mixture therein in the molten state and at a pressure above the foaming pressure thereof, establishing communication between said accumulation zone and a mold maintained at a pressure no greater than the foaming pressure of said molten mixture, and rapidly forcing said molten mixture from said accumulation zone into said mold whereby the pressure differential between said accumulation zone and said mold causes said mixture to rapidly expand in said mold. In other embodiments: the mold is maintained at a pressure of from substantially atmospheric pressure to no greater than the foaming pressure of the molten mixture; the mold is maintained at a temperature below the melting temperature of the mixture; and the pressure in the extruder and the accumulation zone is from at least about 500 p.s.i. to about 5000 p.s.i.

The improved process of this invention for molding foamed thermoplastic articles comprises the steps of (a) fluxing (melting) a mixture of a blowing agent and a thermoplastic material in an extruder at a temperature and pressure above the foaming temperature and pressure of the blowing agent; (b) continuously extruding the mixture into an expanding accumulation zone in continuous communication with the extruder which zone expands at a rate substantially equal to the rate of extrusion while maintaining the mixture therein in the molten state and at a pressure above the foaming pressure thereof; (c) maintaining a mold at a pressure no greater than the pressure at which the mixture foams and expands, and preferably at about atmospheric pressure; (d) establishing communication between the mold and the accumulation zone; (e) rapidly forcing the mixture out of the accumulation zone and into the mold whereby the pressure differential between the accumulation zone and the mold causes the mixture to rapidly expand in the mold; (f) terminating communication between the mold and the accumulation zone at a point where the pressure is above the foaming pressure of the mixture; and (g) thereafter removing the mixture between said point and the mold such as by rapidly forcing the mixture between the point of terminating communication and the mold into the mold, and the like.

Improved apparatus of this invention, suitable for carrying out the present process for molding foamed thermoplastic articles comprises (a) extruder means adapted to flux (melt) and continuously extrude a mixture of a blowing agent and a thermoplastic material at a temperature and pressure above the foaming temperature and pressure of the blowing agent; (b) an expandable accumulation chamber in continuous communication with the extruder adapted to receive the mixture from the extruder and expand at a rate substantially equal to the rate of extrusion and having means for maintaining the mixture therein in the molten state and at a pressure above the foaming pressure thereof; (c) mold means adapted to be maintained at a pressure no greater than the pressure at which the mixture foams and expands and preferably at about atmospheric pressure; (d) means for establishing and terminating communication between the mold and the accumulation chamber at a point where the pressure is above the foaming pressure of the mixture; (e) means for rapidly forcing the mixture out of the accumulation chamber and into the mold when communication is established therebetween; and (f) means for removing the mixture between the means for establishing and terminating communication and the mold when communication is terminated between the mold and the accumulation chamber such as means for rapidly forcing the mixture between the means for establishing and terminating communication and the mold into the mold when such communication is terminated and the like.

The foamed thermoplastic articles produced in accordance with the invention have a total thickness of at least about 150 mils, a unique mottled surface and comprise a cellular core and a substantially non-cellular, integral peripheral shell having a thickness of at least about 20 mils and are characterized by a degree of stiffness at least about five times as great as a completely non-cellular article of the same thermoplastic material, total weight and general shape. The term "mottled surface" is intended to include surfaces having a dull or glossy mottled, wood-like or marbleized texture and/or appearance. Skin thickness of less than about 20 mils are not desirable because a five fold increase in stiffness is not obtained.

Preferred foamed thermoplastic articles produced in accordance with the present invention have the above described mottled surface and a total thickness of at least about 150 mils and comprise a cellular core and a substantially non-cellular, integral peripheral shell having a thickness of from about 20 to about 110 mils, and are characterized by a degree of stiffness at least about five times as great as a completely non-cellular article of the same thermoplastic material, total weight and general shape. Skin thicknesses greater than about 110 mils are not preferred since they mitigate against the weight advantage gained in employing a foam core. The five fold increase in stiffness of the articles of the present invention provides a "structural foam" material having high strength characteristics but low weight. Also, the foamed articles of this invention are characterized by decreased heat conductivity and consequently increased insulation properties are provided due to the internal air cells.

The five fold increase in stiffness and the increased ratio of rigidity to weight can substantially increase the economic feasibility of producing, for example, high strength plastic containers or tote boxes, of the type employed in carrying items such as fruits, glass bottles, or the like by decreasing the amount of plastic required and consequently decreasing the cost of the article. A further economic advantage is realized in that reinforcing ribs need not be employed for strength thus very substantially decreasing the complexity and consequently, decreasing the cost of molds.

Unexpectedly, it has been found that the process of this invention not only produces a dense shell region and a cellular core region, but can also produce an isotropic product free of internal stresses and distortions even in molds at room temperature, which have complex shapes and thick sections.

In one embodiment of this invention, an accumulator device is provided which includes cylinder means having at one end thereof, communication means for the ingress of material into the cylinder from an extruder and for the egress of the material from the cylinder into a mold remote therefrom, and a piston reciprocally movable therein between a first position proximate said one end of the cylinder and a second position distant from said one end. Pressure means are also provided for applying force to the piston member in the direction of said one end. Associated with the cylinder means are valve means, described more fully herein, for establishing and terminating communication between a mold and the cylinder at a point remote from the mold and for forcing material between it and the mold into the mold. Advantageously, means are provided for automatically actuating the valve means. Further, the means can be responsive to the movement of the piston. Thus, when the piston is in the first position, the valve means can be actuated to terminate communication between the mold and the cylinder means, and when the piston is in its second position, the valve means are actuated to establish communication between the mold and cylinder means.

In a further embodiment of this invention, a mold is provided with a primary distributor channel in direct communication with the feed inlet through which the mold is filled and a plurality of secondary distributor channels in communication with the primary channel. This arrangement permits the rapid filling of a mold and results in a molded article of less weight than would be expected without any loss in strength.

Figure 3:
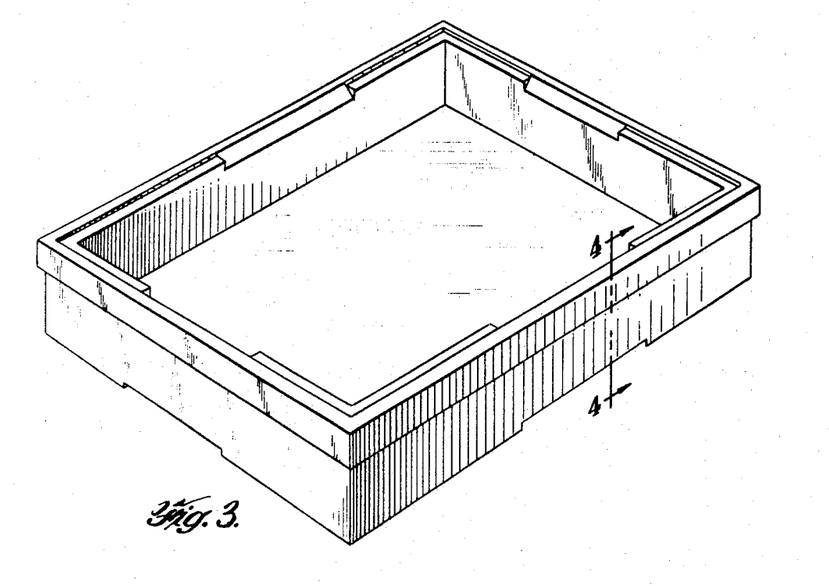
FIGURE 3 is a perspective view of an article molded in accordance with this invention.
Figure 4:
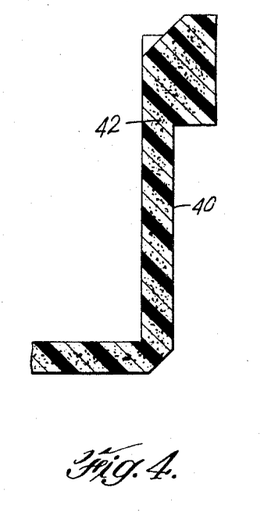
FIGURE 4 is a cross-sectional view of the article of FIGURE 3 taken along the line 4—4.

As is shown in FIGURES 3 and 4, foamed articles such as a tote box can be molded in accordance with the present invention having a total thickness of at least about 150 mils comprising a cellular core 42 and a substantially non-cellular, integral, peripheral shell 40 having a thickness of from about 20 to about 110 mils.

There may be a gradual transition from the cellular core 42 to the dense shell 40 and, therefore, there can be an absence of a clearly defined line of demarcation between the two zones. Moreover, the shell 40 can vary to some extent in thickness. Thus, the term "shell" refers to a general peripheral integral zone of substantial unfoamed, non-cellular material.

Thermoplastic polymeric materials in general can be molded according to the present invention, as for example, polymers and copolymers of olefinically unsaturated compounds and their derivatives such as polyethylene, polypropylene, polystyrene, acrylonitrile-butadiene-styrene polymers, and vinyl resins, nylons, polycarbonates, polyhydroxyethers, polyarylene polyethers, and the like.

The mixture employed in the process can also contain conventional molding additives such as heat and light stabilizers, pigments, mold release agents, and slip agents. A conventional nucleating agent, such as calcium silicate, may be added to the mixture in order to enhance the uniformity of the cells produced by the foaming action. The ingredients of the mixture can be premixed, if desired, and charged to an extruder wherein the thermoplastic material is fluxed and mixed.

The blowing agent can be selected from chemical compounds such as azo, N-nitroso, carbonate and sulfonyl hydrazide compounds which are heat decomposable to yield a gas such as carbon dioxide or nitrogen. The blowing agent can also consist of normally gaseous agents such as methyl chloride, propylene, butylene and gaseous fluorocarbons, as well as gases such as nitrogen, carbon dioxide or air. Volatile liquids such as pentane, water and liquid fluorocarbons can also be employed in the foaming of the polymer.

While the various types of blowing agents which can be employed to product a foamed product can be mixed with the plastic material at various stages in the process, it is advantageous to add liquid or gaseous agents directly to the polymeric material in the extruder, while the thermoplastic material is in a molten state in order to obtain a uniform dispersal of the agent within the molten plastic without employing additional mixing apparatus. Similarly, a decomposable chemical blowing agent is advantageously premixed with the polymer prior to the charging of the polymer into the extruder.

Careful consideration should be given to the means of obtaining a homogeneous distribution of the decomposable chemical foaming agent in the plastic compound. This can be conveniently achieved by adding the foaming agent in the form of solid particles or in the form of a dispersion in a vehicle compatible with the basic resin. The mixing is then carried out in conventional equipment such as a churn, colloid mill, three-roll mill, or Banbury, the choice of which depends upon the viscosity of the plastic compound. Alternatively, to obtain uniform dispersion, pellets of plastic resin can be coated with the blowing agent by tumbling. Regardless of the method used, the foaming agent must be incorporated below its decomposition temperature to prevent the possibility of gas losses taking place in the plastic mass prior to expansion.

In the case of chemical blowing agents premixed with the polymer the time-temperature relations within the extruder must be adequate to decompose the blowing agent to release the gas within the extruder. The extruder pressure must then be maintained uniformly high at least until the mixture is transferred into the high pressure accumulator in order to prevent premature expansion of the cells.

The decomposition of the blowing agent can be delayed through the proper control of the extruder operating temperature and/or through the proper selection of the blowing agent. Thus, for example, diazoaminobenzene can be employed for decomposition at about 95° to 105° C. while azodicarbonamide can be employed for decomposition at the higher temperature range of 160° to 200° C.

Figure 1:
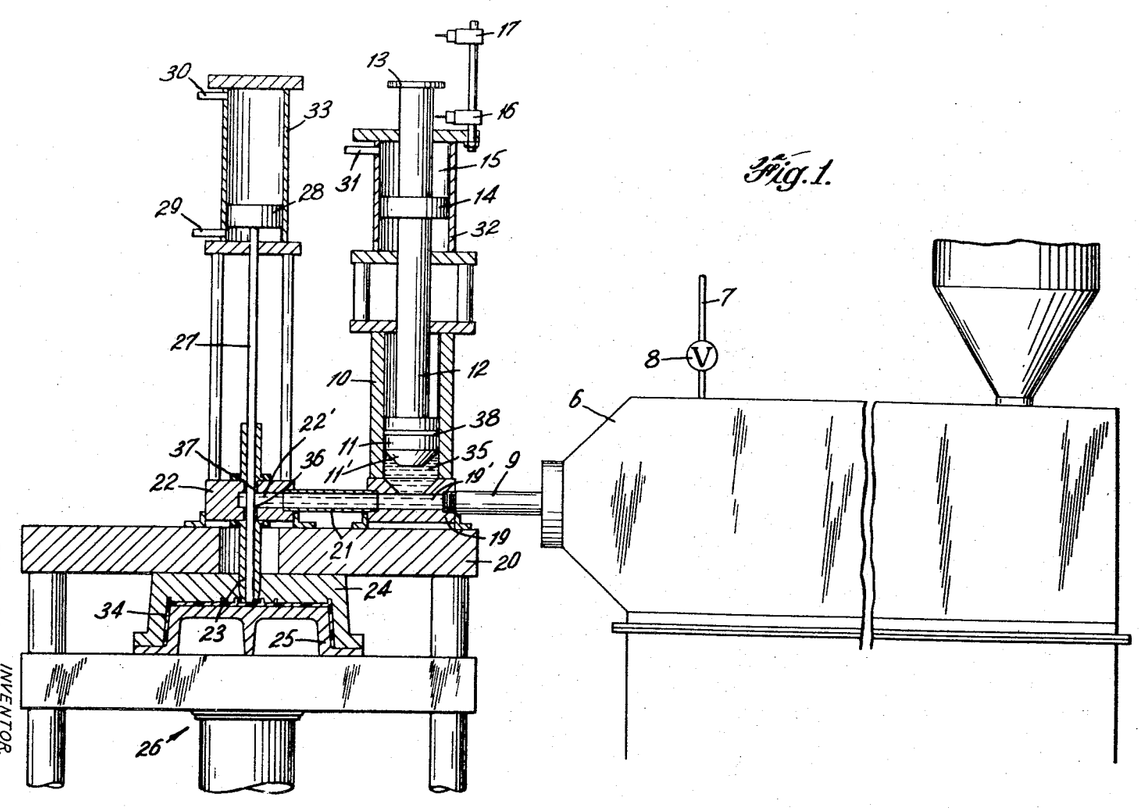
FIGURE 1 is a side elevational view, substantially in central cross section, of preferred apparatus of this invention for carrying out the process of this invention.

Referring now to FIGURE 1, the preferred apparatus of this invention for carrying out the present method is shown to include an extruder 6 having attached thereto a line 7 for feeding a liquid or compressed gas blowing agent directly into the barrel of extruder 6. A valve 8 is provided on line 7 to control the feeding. Line 9 connects the extruder 6 to the internal conduit 19' of a base member 19 which is shown resting on a support member 20. Extending upward from the base member 19 is an accumulator device which includes a cylinder 10 and a piston 11 reciprocally movable therein. The piston 11 is shown having a frusto-conical head 11' and a conventional O-ring 38 positioned around the piston 11 to provide a seal between the cylinder 10 and the piston 11. Attached to the rear of piston 11 and extending upward therefrom is a shaft 12.

A flange member 13 is attached to the other end of the shaft 12 and a piston 14 is located on the shaft at a position intermediate the piston 11 and the flange 13. The piston 14 is adapted to reciprocate within a piston housing 32. It should be noted that flange 13 is located at the uppermost functional end of the shaft 12 and need not be located at the actual physical end thereof. The configuration of the flange 13 is critical only to the extent that it must extend from the shaft 12 and contact switches 16 and 17 during the reciprocal movement of the shaft 12.

Alternatively, photoelectric type switches can be employed if desired, thus eliminating the need for a projecting member on the shaft 12. A pair of photoelectric units can be positioned such that shaft 12 blocks the light path of lower unit when the shaft moves upwardly from its lowest position and blocks the light path of an upper unit when it reaches the desired upper position.

Leading from the internal conduit 19' of the base member 19 is a line 21 which is connected to an internal conduit 22' of a second base member 22 which is also resting on the support member 20. Extending downward from the base member 22, and through the support member 20 is a filling nozzle 23. It should be evident that a plurality of filling nozzles can be employed to mold one or more foamed articles. The lower end of the nozzle 23 extends to and is flush with a mold cavity defined by a male mold half 25 and a female mold half 24. Mold half 24 is conveniently affixed to the support member 20 and the mold half 25 is supported by a reciprocating bed 26 adapted to provide for easy separation of the mold halves 24 and 25 to facilitate product removal. Slidably mounted in the nozzle 23 and the base member 22 is a rod 27. The upper end of the rod 27 is provided with a piston 28 which reciprocates within a piston housing 33. The housing 33 is provided with a pair of conduits 29 and 30 which are alternately connected to a source of gas under pressure.

The operation of the preferred apparatus shown in FIGURE 1 is as follows. Thermoplastic material is fluxed in the extruder 6. A fluid blowing agent is admitted under pressure directly into the barrel of the extruder by means of line 7 and is admixed therein with the melted thermoplastic. The mixture which is extruded from the extruder 6 is at a temperature above the foaming temperature of the blowing agent and under a pressure substantially above the foaming pressure thereof. The extruder 6, which is in continuous communication with an expanding accumulation zone 35 defined by the cylinder 10, the piston 11 and the base member 19, continuously extrudes the mixture of thermoplastic material and blowing agent through line 9, into the zone 35, and against the piston 11. As the mixture is fed from the extruder into the zone 35, the piston is forced from its lowermost position to an upper, predetermined position. In FIGURE 1, the lowermost position of the piston 11 is reached when the piston 11 comes in contact with the base member 19. The upward travel of piston 11 and piston 14 is resisted by means of a gas under pressure in the region 15 above the piston 14 in the piston housing 32. The phrase "gas under pressure" is intended to include any suitable hydraulic fluid conventionally used in such apparatus. In addition, the region 15 in the piston housing 32 is provided with a conduit 31 which is in communication with a source of gas under pressure. As the material from the extruder forces piston 11 upward, and at the same time forces piston 14 upward, the gas in region 15 is compressed. Since the charging of the zone 35 is opposed by the piston 11, the filling of the zone 35 cannot start until the extruder pressure exceeds the back-pressure of the piston 11. As the piston 11 moves upward, the gas volume in region 15 is decreased and the gas pressure is increased. The extruder pressure must continuously exceed the increasing piston pressure during the expansion of the zone 35. Alternatively, during the expansion of the zone 35, the pressure of the gas in region 15 can be regulated so that a substantially constant force is applied to the piston 14. In any case, the mixture being charged into the expanding zone 35 must be maintained at a pressure above the foaming pressure thereof. While a pressure of as low as about 500 p.s.i. will normally prevent premature foaming of the mixture, pressures of at least 1500 p.s.i. have been found to give best results. Pressures in excess of 10,000 p.s.i. are usually not required for proper operation of the accumulator device and normally should be avoided because operating expenses increase with increasing pressures.

In addition, the cylinder 10 is provided with heating means, not shown, to maintain the mixture in the molten state and thus prevent solidification of thermoplastic material therein. It should be noted, however, that no heating of the mixture in the cylinder 10 is required. Heat is applied to the mixture in the extruder 6 and is only maintained in the cylinder 10.

The piston 11 travels upward until the flange 13, carried by the shaft 12, contacts the switch 17 located at a predetermined position. In a manner well known in the art, the activation of the switch 17 causes gas under pressure to enter piston housing 33 through conduit 29 and produces an upward motion of the piston 28. The lower end of the rod 27 is thereby withdrawn from the nozzle 23 until it reaches a position indicated by the reference numeral 37. Communication between the mold defined by mold halves 24 and 25 and the zone 35 is thus established. At the instant communication is established, the mixture is forced from the accumulation zone 35 into the mold because the pressure within the region 15, which has now become greater than the pressure within the zone 35, causes the downward motion of the piston 11 until it reaches its lower-most position. If necessary, the line 21 and the base member 22 can be provided with heating means, not shown, to prevent solidification of thermoplastic material therein. Normally however, the short molding cycles used in the present invention eliminate the need for any additional heating.

When the piston 11 reaches its lower-most position the zone 35 is essentially collapsed and the flange 13 contacts the switch 16, and in a manner well known in the art, gas under pressure is caused to enter the piston housing 33 through conduit 30 thereby producing a downward movement of the piston 28 and the rod 27. At the instant the rod 27 enters the nozzle 23 at the point 36, communication is terminated between the mold and the accumulation zone 35 at a point where the pressure is above the foaming pressure of the mixture. As the rod 27 travels downward it forces the mixture in the nozzle 23, that is, between the point 36 and the mold, into the mold and the bottom of the rod 27 comes flush with the molded article 34. In this manner, a sprue-free molded article is produced and the formation of an unfoamed slug in the system is prevented. The mold halves 24 and 25 are separated and the sprue-free molded article 34, in this case a tote box, shown in FIGURES 3 and 4 and previously described, is removed. It should be evident that foamed articles can be molded according to the present invention having either a sprue or a depression simply by adjusting the rod 27. While it is preferred to mold sprue-free articles, the configuration of certain molded articles will be able to tolerate a sprue or a depression. It should also be evident that the apparatus of this invention can be employed to mold solid thermoplastic articles.

Because of the great pressure differential between the mold and the accumulation zone, the mixture rapidly foams and expands in the mold. The filling of the mold, which is caused by the action of the piston 11, the rod 27, and the expansion of the mixture in the mold, should preferably involve a period of approximately 1 to 15 seconds.

The flow of gas under pressure through conduits 29 and 30 is controlled by means of a valve system actuated by the switches 16 and 17 in a manner well known in the art.

The switch 17 is positioned in accordance with the amount of material which is required to be charged into the mold. The greater the distance between the switches 16 and 17, the greater will be the upward travel of the piston 11. Consequently a larger amount of material will be stored in the accumulation zone 35 and subsequently forced into the mold. Conversely, decreasing the space between the switches 16 and 17 decreases the amount of material which will be forced into the mold.

The process of this invention is capable of rapidly and completely filling a mold to produce a foamed article which is substantially free of orientation and internal stresses (isotropic) comprising a foamed core and a substantially noncellular integral peripheral shell. Problems common to solid injection molding such as incomplete filling of the mold due to premature solidification of the thermoplastic material and high residual internal stresses due to flow resistance in the mold are not encountered. The results obtained with the present invention are believed to be a function of the desired weight of the finished foamed article, the temperature of the molten thermoplastic mixture, the amount of blowing agent in the mixture, the pressure required in the extruder and accumulation zone to prevent foaming of the mixture therein, mold temperature, and mold configuration. When the molten mixture in the accumulation zone, which is under a pressure greater than the foaming pressure thereof, is rapidly transferred to the mold, the pressure differential that exists between the accumulation zone and the mold causes the mixture to rapidly expand into a cellular mass, or, in some instances, to explode into small cellular particles that fuse together in the mold, thereby rapidly filling the mold. Once the mold is initially filled with this cellular mass, more mixture is still entering the mold and its rapid expansion creates an outwardly acting pressure which forces the peripheral portion of the cellular mass against the surface of the mold thereby destroying its cell structure and forming a dense, noncellcular peripheral skin having a thickness of at least about 20 mils surrounding a cellular core. The blowing gas that is expelled during the destruction of the peripheral cells is vented out through suitable openings in the mold such as the miter or parting line in a two part mold. The blowing gas in the act of venting is believed to create the unique mottled surface described above. Skin thickness is controlled by the temperature of the mixture and the pressure employed in the extruder and accumulation zone.

The temperature of the mold is not critical. Cold molds, e.g. at room temperatures, about 20° C. can be used to produce foamed articles having a dull mottled surface similar to the texture and appearance of wood. Lower mold temperatures are preferred since the time required for cooling the article in the mold is shorter. Higher mold temperatures permit more flow of the molten mixture in the mold prior to cooling than with a cooler mold and thus produces a smooth, glossy or glazed mottled surface. When molding high density polyethylene, mold temperatures of at least about 265° F. are used to produce a glossy mottled surface.

Molds which cause sharp pressure drops to take place therein, due to a complex configuration, or sharp corners or the like, require the use of a greater amount of blowing gas in order to achieve a particular degree of foaming than a mold which has, for example, a simple configuration like that of a bowling pin and which produces a more gradual pressure drop.

From the foregoing description, it is evident that the process and preferred apparatus of this invention can be employed to rapidly, efficiently, and automatically mold foamed thermoplastic articles on a batch, semi-continuous or continuous basis.

Figure 2:
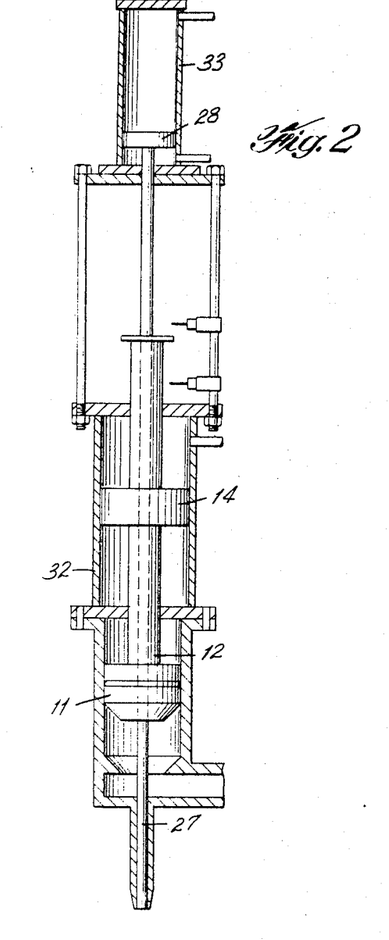
FIGURE 2 is a side elevational view, partially in central cross section of an alternate embodiment of the accumulator device of this invention.

FIGURE 2 illustrates an alternate embodiment of the accumulator device of this invention. In this embodiment, the piston 11 and the shaft 12 are shown co-axial with the rod 27 thus providing a more compact equipment arrangement. The piston 11 and the shaft 12 are provided with a centrally positioned internal bore in which the rod 27 reciprocates. Migration of material between the rod 27 and the internal bore of the piston 11 and the shaft 12 is prevented by providing a slip fit between the rod and bore and/or providing conventional sealing rings therebetween. The piston housing 33 for the piston 28 is mounted above and is co-axial with the piston housing 32 for the piston 14. The operation of the accumulator device shown in FIGURE 2 is the same as has been described previously for the apparatus of FIGURE 1.

Figure 5:
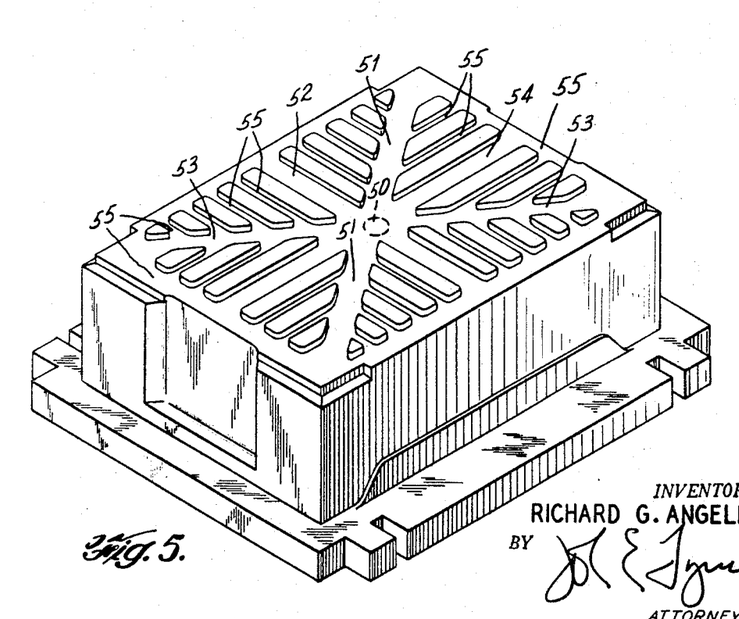
FIGURE 5 is an isometric view of a male half of a mold of this invention showing the primary and secondary distributor channels therein.

In one embodiment of this invention, it has been found that the use of a primary distributor channel in the mold in conjunction with a plurality of secondary distributor channels permits rapid filling of a mold and results in a molded article of less weight than would be expected without any loss in strength. This embodiment is illustrated in FIGURE 5 wherein the male half of an open structure tote box mold is shown. A female mold half, not shown, is adapted to fit over the male half, in the arrangement similar to the mold halves shown in FIGURE 1, thereby forming a mold cavity and the distributor channels described below. Such distributor channels may be employed in molds for producing open structures such as "tote" boxes for tomatoes, eggs and the like, or for producing closed structures such as a storage battery casing and the like. The primary distributor channel in the mold is in direct communication with the feed inlet through which the mold is filled while the secondary distributor channels are in communication with the primary distributor channel. For purposes of this invention, it is preferred to employ a plurality of primary distributor channels arranged in an equally spaced radial pattern about the feed inlet or inlets through which the mold is filled with at least one of the primary channels each having a plurality of secondary distributor channels in communication therewith.

As is shown in FIGURE 5, it is even more preferred to employ a plurality of primary distributor channels 51, 52, 53 and 54 arranged in an equally spaced radial pattern about the feed inlet through which the mold is filled, the position of which in the female half (not shown) is indicated by the dotted circle 50 on the male half, with the primary channels 51 and 53 each having at least four equally spaced secondary distributor channels 55 in communication therewith. Thus, it is possible to employ two or more radially spaced primary distributor channels (52 and 54) in a mold without any secondary distributor channels in communication therewith with two or more radially spaced primary distributor channels (51 and 53) each having two or more secondary distributor channels in communication therewith. With such distributor channels, a mold can be filled so rapidly that the molded article weighs less than would be expected but, because of the unique rigidity to weight ratios obtainable with the process of this invention, does not exhibit any decrease in strength as would be expected from the reduction in weight.

A wide variety of useful foamed articles can be molded in accordance with this invention. Illustrative, but by no means limiting of such articles are shoe lasts, bowling pins, containers, particularly fluid-tight and/or thermally insulated containers, such as storage battery cases and the like, farm product containers such as asparagus and tomato boxes, poultry coops, milk cases and the like, other containers such as bomb fin, shell and soda cases, battery trays, shopping cart brackets, gun stocks, paint brush handles, brush blocks, broom and shovel handles, kitchen drawers, car seats, seat and back pans for children's car seats, seat frames for highchairs, frames for bady recliners, top and storage bins for baby dressers, wardrobes and bathinettes, furniture drawers, take-or-leave pallets, lawn mower housings, fan shrouds for gasoline engines, conduits, articles having the appearance, sound and weight characteristics of wood and the like.

It is to be understood that while the mixture in the accumulation zone is maintained at a substantially constant pressure, this pressure being greater than the pressure at which the flowing agent causes the foaming and expansion of the foamable material, pressures which would absolutely prevent foaming are unnecessary in the instant invention for minor bubbling is not signficant and is not detrimental to the resultant product.

As indicated previously, FIGURE 1 shows a preferred apparatus. However, modifications may be made therein without departing from the spirit or scope of this invention. For instance other means besides rod 27 can be employed to terminate communication at a point remote from the mold where the pressure is above the foaming pressure of the mixture and for removing the mixture between such point and the mold. Suitable means for terminating communication include valve means that function to terminate communication at said point by a mechanical motion that is parallel to the direction of flow of the mixture. Such mechanical motion may be in the same or opposite direction to that of the flow of the mixture. Such valves include rod and nozzle valves, globe valves, plug valves, needle valves, poppet valves, ball valves, disc valves, check valves, and the like.

Other such suitable means for terminating communication include valve means that function to terminate communication at said point by a mechanical motion that is generally perpendicular to the direction of flow of the mixture. Such valves includes gate valves, rotary disc valves, piston valves, cut-off valves, rotary ball valves, rotary plug valves, slide valves including simple sliding valves (guillotine motion) and sliding valves with a hole, check valves and the like.

The location of the point where the pressure is above the foaming pressure of the mixture will, of course, depend upon the rate at which the mixture is forced from zone 35 into the mold and the efficiency of the means for terminating communication. For example, the rate at which the mixture is forced from zone 35 can be increased by admitting gas under pressure through line 31 into zone 15 at the moment piston 12 begins its downward stroke to accelerate its downward movement. Thus, the point where the pressure is above the foaming pressure of the mixture can be quite close to the mold when the mixture is forced from zone 35 by accelerating the downward travel of piston 12 and/or when rapidly acting means are employed to terminate communication. The phrase "remote from the mold" then is intended to mean any point where the pressure is above the foaming pressure of the mixture.

When means other than rod 27 are employed to establish and terminate communication, the mixture between the means where communication is terminated at a point where the pressure is above the foaming pressure and the mold can be removed in various ways. For instance it can be removed as a runner or sprue attached to the molded part which can easily be trimmed off later. Also, the mixture can be forced into the mold while still in a formable state by admitting gas under pressure on the down stream side of the valve or by using mechanical means such as a sliding piston in conjunction with a separate valve. It is also possible, depending on the configuration of the molded part, to place a rapidly acting valve having a motion perpendicular to the direction of flow of the mixture, such as a poppet, sliding plate or disc valve, flush with the mold cavity. In this instance the point where the pressure is above the foaming pressure of the mixture would be just flush with the mold cavity and there would be essentially no mixture between the point to remove or force into the mold.

In another embodiment the rod 27 shown in FIGURE 1 can travel in a direction opposite to that described. Here the rod 27 would reciprocate in or through the mold, moving down into the mold cavity to establish communication and up into nozzle 23 to terminate communication and would produce a molded part having a hole therethrough where rod 27 travelled. In this instance also the point where the pressure is above the foaming pressure of the mixture would be flush with the mold cavity and there would be essentially no mixture between the point and the mold after terminating communication.

It is within the spirit and scope of this invention to use screw-injection type apparatus, such as that described in U.S. Patent 3,124,841, in conjunction with means as described herein for establishing and terminating communication between the mold and the accumulation zone or chamber, and the extruder (screw) at a point where the pressure is above the foaming pressure of the mixture and means for removing the mixture between said point and the mold also as described herein. The accumulation zone or chamber in this instance is between the extrusion screw and the aforesaid means for establishing and terminating communication. As the screw rotates the pressure in the accumulation zone is above the foaming pressure of the mixture and the back pressure of the screw itself drives the screw backward thus expanding the accumulation zone while maintaining the pressure above the foaming pressure. At a predetermined point the means would establish communiaction between the accumulation zone and the mold, the screw driven forward, and communication terminated at a point where the pressure is above the foaming pressure of the mixture. In this embodiment the screw would perform the functions of both the extruder 6 and the piston 12 shown in FIGURE 1.

The phrases "melt index," "melting temperature," "foaming pressure," and "foaming temperature" as used herein are defined as follows:

"Melt index" is an indication of molecular weight and viscosity and is determined in accordance with ASTM Test D–1238–57T.

The phrase "melting temperature" refers to the general temperature range at which the material becomes sufficiently fluid to be processed in the manner heretofore described. Thus the material would thus be about sufficiently soft or fluid to flow through an extruder, an accumulator or a mold, or be foamed and expanded by an internally contained gas.

The phrase "foaming pressure" refers to the pressure at which an internally contained gas can produce the substantial foaming and expansion of the plastic material within which it is contained.

The phrase "foaming temperature" refers to the temperature above which a solid or liquid blowing agent will become a gas at pressures less than the foaming pressure.

The following examples are intended to further illustrate the present invention without limiting the same in any manner.

EXAMPLE 1

The equipment shown in FIGURE 1 was used to mold seat and back pans for an infant car seat from polyethylene having a density of 0.96 and a melt index of 4.0 under the following conditions:

| | |
|---|---|
| Extruder r.p.m. | 16 |
| Temperature of material in extruder °F | 515 |
| Nitrogen injection pressure, FIG. 1, reference numeral 7 p.s.i. | 2400 |
| Accumulation zone pressure p.s.i. | 2800 |
| Accumulation zone temperature °F | 350 |
| Mold pressure | Atmospheric |
| Mold temperature °F | 45 |

The molded pans had a dull, mottled surface and had a cellular core and a non-cellular skin about 50 mils thick in cross section, and had a total thickness of about 250 mils.

EXAMPLE 2

The equipment shown in FIGURE 1 was used to mold child's safety car seats from polyethylene having a density of 0.96 and a melt index of 4.0 under the following conditions:

| | |
|---|---|
| Extruder r.p.m. | 17 |
| Temperature of material in extruder °F | 540 |
| Nitrogen injection pressure, FIG. 1, reference numeral 7 p.s.i. | 2400 |
| Accumulation zone pressure p.s.i. | 2800 |
| Accumulation zone temperature °F | 350 |
| Mold pressure | Atmospheric |
| Mold temperature °F | 50 |

The molded seats had dull, mottled surface, a cellular core and a non-cellular skin in cross section. No voids were present in the molded parts.

EXAMPLE 3

The equipment shown in FIGURE 1 was used to mold sprue-free kitchen cabinet drawers from a blend of 25 lbs. of polyethylene having a density of 0.96 and a melt index of 4.0 and 5 lbs. of medium impact, free flowing polystyrene having a Rossi-Peans flow of 32 seconds under the following conditions:

| | |
|---|---|
| Extruder r.p.m. | 25 |
| Temperature of material in extruder °F | 530 |
| Nitrogen injection pressure, FIG. 1, reference numeral 7 p.s.i. | 2800 |
| Accumulation zone pressure p.s.i. | 2800 |
| Accumulation zone temperature °F | 350 |
| Mold pressure | Atmospheric |
| Mold temperature °F | ~60 |

The molded drawers were sprue free, had a dull, mottled surface and a cellular core and a non-cellular skin in cross section. The Izod impact (ASTM D-256) of the drawers was 1.06.

EXAMPLE 4

Example 3 was duplicated using instead a blend of 25 lbs. polyethylene and 1 lb. polystyrene. Results were the same and the Izod impact was 1.26.

EXAMPLE 5

The equipment shown in FIGURE 1 but with the accumulator device of FIGURE 2 was used to mold sprue free rectangular containers from polypropylene under the following conditions:

| | |
|---|---|
| Temperature of material in extruder °F | 400 |
| Nitrogen injection pressure, FIG. 1, reference numeral 7 p.s.i. | 600 |
| Accumulation zone pressure p.s.i. | 2000 |
| Accumulation zone temperature °F | 350 |
| Distance between switches 16 and 17 inches | 6¾ |
| Mold pressure | Atmospheric |
| Mold temperature °F | 70 |

A shot weight of 3.93 pounds was obtained having an overall density of 0.66 and the material completely filled the mold leaving no voids in the mold. The molded article was sprue free and in cross section had a cellular core and a substantially non-cellular, integral peripheral shell having a dull, mottled surface.

EXAMPLE 6

Example 5 was duplicated but the distance between the switches was 6½" and the injection pressure of the nitrogen was increased from 600 p.s.i. to 1500 p.s.i. The container had a shot weight of 3.80 pounds and an overall density of 0.64. The material completely filled the mold.

EXAMPLE 7

Example 5 was duplicated with the switches 6¼" apart and the nitrogen pressure maintained at 1500 p.s.i. The shot weight of the container was 3.68 pounds and the overall density was 0.62. The mold was completely filled with material and no voids appeared.

EXAMPLE 8

The equipment shown in FIGURE 1 but with the accumulator device of FIGURE 2 was used to mold sprue-free rectangular containers from polyethylene having a density of 0.96 and a melt index of 4.0 under the following conditions:

| | |
|---|---|
| Temperature of material in extruder °F | 400 |
| Nitrogen injection pressure, FIG. 1, reference numeral 7 p.s.i. | 1800 |
| Accumulation zone pressure p.s.i. | 2000 |
| Accumulation zone temperature °F | 350 |
| Distance between switches 16 and 17 inches | 5¾ |
| Mold pressure | Atmospheric |
| Mold temperature °F | 70 |

The mold was completely filled and the containers were sprue-free and had a dull, mottled surface, a cellular core and a non-cellular skin in cross section. A container weighing 3.33 lbs. was obtained having an overall density of 0.56. The mold was completely filled with material and no voids were present in the mold.

EXAMPLE 9

Example 8 was duplicated using a nitrogen injection pressure of 1500 p.s.i. The distance between the switches was 6¾". A container weighing 3.97 lbs. and having a density of 0.67 was obtained. The mold was completely filled with no voids noted.

EXAMPLE 10

The equipment shown in FIGURE 1 but with the accumulator device of FIGURE 2 was used to mold sprue free two cell battery casings and covers from polyethylene having a density of 0.96 and a melt index of 4.0 under the following conditions:

| | |
|---|---|
| Extruder r.p.m. | 12 |
| Temperature of material in extruder °F | 600 |
| Nitrogen injection pressure, FIG. 1, reference numeral 7 p.s.i. | 2800 |
| Accumulation zone pressure p.s.i. | 2800 |
| Accumulation zone temperature °F | 350 |
| Mold pressure | Atmospheric |
| Mold temperature °F | 60 |

The molded casing had a dull, mottled surface, was sprue free and had a total thickness of 190-205 mils and required no further finishing. In a manner well known in the art, a two cell, 3 volt battery was constructed using the molded casing and cover with carbon-zinc electrodes and an alkaline electrolyte. The dielectric strength of the casing walls was found to be above 80 volts/mil. After one month, a weight increase of less than 1% was noted and the strength of the casing was substantially unchanged.

EXAMPLE 11

The equipment shown in FIGURE 1 but with the accumulator device of FIGURE 2 was used to mold sprue free kitchen cabinet drawers from a medium impact, free-flowing polystyrene having a Rossi-Peans flow of 32 seconds under the following conditions:

| | |
|---|---|
| Extruder r.p.m. | 22 |
| Temperature of material in extruder °F | 550 |
| Nitrogen injection pressure, FIG. 1, reference numeral 7 p.s.i. | 2800 |
| Accumulation zone pressure p.s.i. | 2800 |
| Accumulation zone temperature °F | 350 |
| Mold pressure | Atmospheric |
| Mold temperature °F | 80 |

The mold was completely filled and the molded drawers had a dull, mottled surface, were sprue free and had a cellular core and a non-cellular skin in cross section.

EXAMPLE 12

The equipment shown in FIGURE 1 but with the accumulator of FIGURE 2 was used to mold milk carton tote boxes from acrylonitrile-butadiene-styrene resin under the following conditions:

| | |
|---|---|
| Extruder r.p.m. | 15 |
| Temperature of material extruder °F | 450 |
| Nitrogen injection pressure, FIG. 1, reference numeral 7 p.s.i. | 2800 |
| Accumulation zone pressure p.s.i. | 3000 |
| Accumulation zone temperature °F | 355 |
| Mold pressure | Atmospheric |
| Mold temperature °F | ~60 |

The mold was completely filled and the molded article had a dull, mottled surface, a cellular core and a non-cellular skin in cross section.

EXAMPLE 13

The equipment shown in FIGURE 1 but with the accumulator device of FIGURE 2 was used to mold lawn mower housings from polyethylene having a density of 0.96 and a melt index of 0.2 under the following conditions:

| | |
|---|---|
| Extruder r.p.m. | 15 |
| Temperature of material in extruder °F | 515 |
| Nitrogen injection pressure, FIG. 1, reference numeral 7 p.s.i. | 2700 |
| Accumulation zone pressure p.s.i. | 3000 |
| Accumulation zone temperature °F | 350 |
| Mold pressure | Atmospheric |
| Mold temperature °F | ~60 |

The mold was completely filled and the molded article had a dull, mottled surface, a cellular core and a non-cellular skin in cross section.

EXAMPLE 14

The equipment shown in FIGURE 1 but with the accumulator device of FIGURE 2 was used to mold battery casings from a polyethylene-ethyl acetate copolymer containing 18 percent by weight of ethyl acetate under the following conditions:

| | |
|---|---|
| Extruder r.p.m. | 19 |
| Temperature of material in extruder °F | 405 |
| Nitrogen injection pressure, FIG. 1, reference numeral 7 p.s.i. | 2850 |
| Accumulation zone pressure p.s.i. | 3000 |
| Accumulation zone temperature °F | 350 |
| Mold pressure | Atmospheric |
| Mold temperature °F | ~60 |

The mold was completely filled and the molded article had a dull, mottled surface, a cellular core and a non-cellular skin in cross section.

EXAMPLE 15

The equipment shown in FIGURE 1 but with the accumulator device of FIGURE 2 was used to mold battery casings from a polyethylene-vinyl acetate copolymer containing 28 percent by weight vinyl acetate under the following conditions:

| | |
|---|---|
| Extruder r.p.m. | 18 |
| Temperature of material in extruder °F | 385 |
| Nitrogen injection pressure, FIG. 1, reference numeral 7 p.s.i. | 2800 |
| Accumulation zone pressure p.s.i. | 2800 |
| Accumulation zone temperature °F | 350 |
| Mold pressure | Atmospheric |
| Mold temperature °F | ~60 |

The mold was completely filled and the molded article had a dull, motted surface, a cellular core and a non-cellular skin in cross section.

EXAMPLE 16

The apparatus of FIGURE 1 but with the accumulator device of FIGURE 2 was employed. One hundred parts of grey pigmented polyethylene pellets having a density of 0.96 were charged into an extruder. The polyethylene was worked and heated in the extruder until the material attained a temperature of about 420° F. Nitrogen was slowly fed into the barrel of the extruder and therein mixed with the molten polyethylene. The extruder 6 charged material to an accumulation zone 35 maintained at 350° F. and under a pressure of 2300 p.s.i. The mold was maintained at about 70° F. and at atmospheric pressure.

The mold design used was an open structure for a rectangular tomato tote box having eight equally spaced voids (or slots in the molded box) parallel to each other and running the length of the bottom of the mold. The feed inlet through which the mold was filled was located centrally of the bottom of the mold (outside bottom of the molded box). Four tote boxes molded using this mold had an average weight of 3.82 pounds and an average tensile strength of about 1200 p.s.i.

The mold design was then modified to provide a distributor channel running diagonally from one corner in the bottom of the mold to the other. Thus, the modified mold was provided with two primary distributor channels in communication with the feed inlet and arranged in an equally spaced radial pattern about the feed inlet with each having a plurality (ten) of secondary distributor channels in communication therewith. Two tote boxes molded using the modified mold had an average weight of 3.61 pounds and an average tensile strength of about 1200 p.s.i. The average weight here was 0.21 pound less than the boxes molded with the unmodified mold yet the tensile strength remained substantially the same. This was quite unexpected because in adding a diagonal distributor channel, it would be expected that the weight would be added to the molded box rather than a decrease in weight as was actually discovered.

I claim:
1. Process for molding foamed thermoplastic articles characterized by a high degree of stiffness, a cellular core and a substantially non-cellular, integral peripheral shell having a unique motted surface which comprises the steps of
    (a) fluxing a mixture of a blowing agent and a thermoplastic material in an extruder at a temperature and pressure above the foaming temperature and pressure of said blowing agent;
    (b) continuously extruding said mixture into an expanding accumulation zone while maintaining the mixture therein in the molten state and at a pressure above the foaming pressure thereof;
    (c) maintaining a mold at a pressure no greater than the pressure at which said mixture foams and expands;
    (d) establishing communication between said mold and said zone;
    (e) rapidly forcing said mixture out of said zone and into said mold whereby the pressure differential between said zone and said mold causes said mixture to rapidly expand in said mold; and
    (f) terminating communication between said mold and said zone at a point where the pressure is above the foaming pressure of said mixture.

2. Process of claim 1 which includes the step of removing the mixture between said point and said mold after terminating communication between said mold and said zone.

3. Process of claim 1 which includes the step of rapidly forcing the mixture between said point and said mold into said mold after terminating communication between said mold and said zone.

4. Process of claim 1 wherein said mold is maintained at a temperature below the melting temperature of said thermoplastic material.

5. Procss of claim 1 wherein said mold is at a pressure of from substantially atmospheric pressure to no greater than the foaming pressure of said mixture.

6. Process of claim 1 wherein said mold is provided with a plurality of primary distributor channels in direct communication with the feed inlet through which said mold is filled and arranged in an equally spaced radial pattern about said feed inlet, at least two of said primary channels each having a plurality of secondary distributor channels in communication therewith.

7. Process of claim 1 wherein the pressure in said extruder and said zone is from at least about 500 p.s.i. to about 10,000 p.s.i.

8. Process of claim 1 wherein the establishment and termination of communication between said mold and said zone is determined by the expansion and collapse of said accumulation zone.

9. Process of claim 1 wherein said mixture is rapidly forced between said point and said mold into said mold in such a manner that a spruce free article is produced.

10. Process of claim 1 wherein said thermoplastic material is fluxed in an extruder and admixed therein with a fluid blowing agent at a temperature and pressure above the foaming temperature and pressure of said blowing agent.

11. Process of claim 10 wherein said fluid blowing agent is a gas.

12. Process of claim 11 wherein said gas is nitrogen.

13. Apparatus for molding foamed thermoplastic articles characterized by a high degree of stiffness, a cellular core and a substantially non-cellular integral peripheral shell having a unique mottled surface comprising:
  (a) extruder means adapted to continuously extrude a mixture of a blowing agent and a thermoplastic material at a temperature and pressure above the foaming temperature and pressure of said blowing agent;
  (b) an expandable accumulation chamber in continuous communication with said extruder adapted to receive said mixture from said extruder and to maintain the mixture therein in the molten state and at a pressure above the foaming pressure thereof;
  (c) mold means adapted to be maintained at a pressure no greater than the pressure at which said mixture foams and expands;
  (d) means for establishing and terminating communication between said mold means and said accumulation chamber at a point where the pressure is above the foaming pressure of said mixture; and
  (e) means for rapidly forcing said mixture out of said accumulation chamber and into said mold when communication is established therebetween.

14. Apparatus of claim 13 wherein said mold means is adapted to be maintained at a pressure of from substantially atmospheric pressure to no greater than the foaming pressure of said mixture.

15. Apparatus of claim 13 wherein said extruder means and said accumulation chamber are adapted to be maintained at a pressure of from at least about 500 p.s.i. to about 10,000 p.s.i.

16. Apparatus of claim 13 wherein means are provided for removing the mixture between said means for establishing and terminating communication and said mold after communication is terminated between said mold and said accumulation chamber.

17. Apparatus of claim 13 wherein means are provided for rapidly forcing the mixture between said means for establishing and terminating communication and said mold into said mold when communication is terminated between said mold and said accumulation chamber.

18. Apparatus as defined in claim 13 wherein said mold has a primary distributor channel in direct communication with the feed inlet through which said mold is filled and a plurality of secondary distributor channels in communication with said primary channel.

19. Apparatus as defined in claim 13 wherein said mold has a plurality of primary distributor channels in direct communication with the feed inlet through which said mold is filled and arranged in an equally spaced radial pattern about said feed inlet, at least two of said primary channels each having a plurality of secondary distributor channels in communication therewith.

20. Apparatus of claim 13 wherein said extruder means is adapted to flux and mix a thermoplastic material with a fluid blowing agent at a temperature and pressure above the foaming temperature and pressure of said blowing agent, and to continuously extrude the mixture of said thermoplastic material and said blowing agent.

21. Apparatus of claim 13 wherein means are provided to actuate said means for establishing and terminating communication, said means being responsive to the movement of said accumulation chamber.

22. Apparatus of claim 13 which includes a filling nozzle in communication with said mold and said accumulation chamber, and rod means adapted to slide out of said nozzle thereby establishing communication between said mold and said accumulation chamber and to slide into said nozzle at a point where the pressure is above the foaming pressure of said mixture thereby terminating communication between said mold and said accumulation chamber, said rod means being adapted to rapidly force the mixture in said nozzle between said point and said mold into said mold after terminating communication between said mold and said accumulation chamber.

23. Apparatus of claim 22 wherein said accumulation chamber and said rod means are coaxial.

24. Apparatus of claim 22 wherein means are provided to actuate said rod means, said means being responsive to the movement of said accumulation chamber.

25. Mold suitable for use in molding foamed thermoplastic articles comprising a plurality of primary distributor channels in direct communication with the feed inlet through which said mold is filled and arranged in an equally spaced radical pattern about said feed inlet, at least two of said primary channels each having a plurality of secondary distributor channels in communication therewith, all of said distributor channels being adapted to form a part of said foamed article.

References Cited

UNITED STATES PATENTS

| | | | |
|---|---|---|---|
| 2,196,815 | 4/1940 | Sawyer. | |
| 2,578,518 | 12/1951 | Ditz | 136—166.241 |
| 2,643,158 | 6/1953 | Baldanza. | |
| 2,733,479 | 2/1956 | English. | |
| 2,898,632 | 8/1959 | Irwin et al. | 264—48 |
| 2,993,733 | 7/1961 | Pinkham | 297—445 |
| 3,058,161 | 10/1962 | Beyer et al. | 264—47 |
| 3,160,306 | 12/1964 | Smalley. | |
| 3,206,247 | 9/1965 | Johnson | 297—377 XR |
| 3,211,605 | 10/1965 | Spaak et al. | 264—321 XR |
| 3,218,375 | 11/1965 | Hardwick | 264—48 XR |
| 3,264,396 | 8/1966 | Beesley et al. | |
| 3,268,636 | 8/1966 | Angell | 264—51 |
| 3,299,192 | 1/1967 | Lux | 264—48 |
| 3,306,960 | 2/1967 | Weissman et al. | 264—48 XR |
| 3,324,784 | 6/1967 | Lambie et al. | 98—116 XR |

OTHER REFERENCES

Zielinski, A. R.: "Injection Molding Expandable Polystyrene Beads," Plastics World, January 1962, pp. 18–20.

PHILIP E. ANDERSON, *Primary Examiner.*

U.S. Cl. X.R.

18—5, 30, 42; 98—116; 206—1; 264—50, 328; 297—445

Disclaimer 3,436,446.—*Richard G. Angell, Jr.*, Bridgewater Township, Somerville, N.J.
MOLDING OF FOAMED THERMOPLASTIC ARTICLES. Patent dated Apr. 1, 1969. Disclaimer filed Oct. 15, 1971, by the assignee, *Union Carbide Corporation.*

Hereby enters this disclaimer to claims 13, 14, 15 and 20 of said patent.
[*Official Gazette February 15, 1972.*]

Disclaimer 3,436,446.—*Richard G. Angell, Jr.*, Bridgewater Township, Somerville, N.J. MOLDING OF FOAMED THERMOPLASTIC ARTICLES. Patent dated Apr. 1, 1969. Disclaimer filed Mar. 4, 1977, by the assignee, *Union Carbide Corporation*.

Hereby enters this disclaimer to claims 1 through 12, 16 through 19 and 21 through 25 of said patent.

[*Official Gazette May 3, 1977.*]